United States Patent
Ando

(10) Patent No.: US 10,518,614 B2
(45) Date of Patent: Dec. 31, 2019

(54) VEHICLE DOOR STRUCTURE

(71) Applicant: Toyota Jidosha Kabushiki Kaisha, Toyota-shi, Aichi-ken (JP)

(72) Inventor: Tatsunori Ando, Nisshin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 63 days.

(21) Appl. No.: 15/915,567

(22) Filed: Mar. 8, 2018

(65) Prior Publication Data
US 2018/0264919 A1 Sep. 20, 2018

(30) Foreign Application Priority Data
Mar. 15, 2017 (JP) .................. 2017-050223

(51) Int. Cl.
*B60J 5/04* (2006.01)

(52) U.S. Cl.
CPC .......... *B60J 5/0456* (2013.01); *B60J 5/0423* (2013.01); *B60J 5/0443* (2013.01)

(58) Field of Classification Search
CPC ...... B60J 5/0456; B60J 5/0443; B60J 5/0445; B60J 5/0458; B60J 5/0437; B60J 5/0423; B60J 5/0431
USPC ..................................... 296/146.6
See application file for complete search history.

(56) References Cited

U.S. PATENT DOCUMENTS

| | | | | |
|---|---|---|---|---|
| 5,599,057 A | * | 2/1997 | Hirahara | B60J 5/0437 296/146.6 |
| 5,800,007 A | * | 9/1998 | Cho | B62D 25/04 296/146.6 |
| 5,813,719 A | * | 9/1998 | Kowalski | B60J 5/0444 296/146.6 |
| 9,592,721 B1 | * | 3/2017 | Kelly | B60J 5/0422 |
| 2005/0017538 A1 | * | 1/2005 | Omori | B60J 5/0411 296/146.6 |
| 2010/0148535 A1 | * | 6/2010 | Takahashi | B60J 5/0426 296/187.12 |
| 2012/0091750 A1 | * | 4/2012 | Danaj | B60J 5/0437 296/146.6 |
| 2013/0140845 A1 | * | 6/2013 | Jeon | B60J 5/0455 296/146.6 |
| 2014/0375078 A1 | * | 12/2014 | Fujihara | B60J 5/0443 296/146.6 |
| 2016/0159207 A1 | * | 6/2016 | Ogawa | B60J 5/0427 49/504 |
| 2017/0036521 A1 | * | 2/2017 | Ogawa | B60J 5/0456 |
| 2018/0111452 A1 | * | 4/2018 | Deng | B60J 5/0437 |
| 2018/0208029 A1 | * | 7/2018 | Tanaka | B60J 5/0443 |
| 2018/0264919 A1 | * | 9/2018 | Ando | B60J 5/0437 |

(Continued)

FOREIGN PATENT DOCUMENTS

JP H09175180 A 7/1997

*Primary Examiner* — Gregory A Blankenship
(74) *Attorney, Agent, or Firm* — Dinsmore & Shohl LLP

(57) ABSTRACT

A vehicle door structure includes: a door inner including a body wall portion, a first opposed wall portion, and a second opposed wall portion; a door outer panel; an impact beam; an impact beam extension including a door-inner-side end portion and a fixed end; and a first reinforcement including a support portion fixed to the first opposed wall portion and a free end portion extending from the support portion toward the impact beam, wherein the impact beam extension and the free end portion are configured to be fitted to each other.

20 Claims, 6 Drawing Sheets

(56) References Cited

U.S. PATENT DOCUMENTS

2019/0084386 A1\* 3/2019 Tanaka ................... B60J 5/0425
2019/0176591 A1\* 6/2019 Jeon ....................... B60J 5/0483

\* cited by examiner

VEHICLE DOOR STRUCTURE

CROSS-REFERENCE TO RELATED APPLICATIONS

This application claims priority to Japanese Patent Application No. 2017-050223 filed on Mar. 15, 2017, which is incorporated herein by reference in its entirety including the specification, drawings and abstract.

BACKGROUND

1. Technical Field

This disclosure relates to a vehicle door structure.

2. Description of Related Art

A door of a vehicle includes: a door body portion having a bag structure in which a door inner on a passenger compartment side and a door outer panel on a vehicle outer side are integrated in a peripheral portion; and a window frame portion attached to an upper part of the door body portion. In order to secure rigidity of the door with respect to a collision, an impact beam is placed inside the door body portion over a front-rear direction of the door. Connecting members, called an impact beam extension, are welded to a front end and a rear end of the impact beam, so that the impact beam is fixed to the door inner via the impact beam extensions.

Japanese Patent Application Publication No. 9-175180 (JP 9-175180 A) describes a structure in which a second extension is welded to a front end of an impact beam together with a conventional impact beam extension, as an impact beam support structure of a vehicle door. JP 9-175180 A describes that the second extension has a generally U-shaped bending shape, and its bending edge is superimposed on a hinge attachment retainer of a door inner and is fixed thereto, so that an impact received by the impact beam via a hinge is received by a pillar.

SUMMARY

In the vehicle door structure, when the vehicle has a side collision, a stress concentration occurs in a connection point between the door inner and the impact beam extension along with the impact beam receiving its load, which might cause a possibility that the connection point breaks. In view of this, a vehicle door structure that can restrain the stress concentration on the connection point between the door inner and the impact beam extension at the time when the vehicle receives an impact is demanded.

A vehicle door structure according to a first aspect of this disclosure includes: a door inner including a body wall portion placed along a vehicle front-rear direction, a first opposed wall portion extending toward outside of a vehicle in a vehicle width direction from an edge of the body wall portion in the vehicle front-rear direction, and a second opposed wall portion extending from an outer edge of the first opposed wall portion in the vehicle width direction so as to be away from a center of the body wall portion in the vehicle front-rear direction; a door outer panel placed further from a center of the vehicle than the door inner is in the vehicle width direction so as to be opposed to the door inner, an peripheral edge of the door outer panel being connected to the second opposed wall portion; an impact beam extending in the vehicle front-rear direction between the door inner and the door outer panel; an impact beam extension including a door-inner-side end portion fixed to the first opposed wall portion or the second opposed wall portion, and a fixed end, the impact beam being fixed on an outer surface of the fixed end in the vehicle width direction; and a first reinforcement including a support portion fixed to the first opposed wall portion, and a free end portion extending from the support portion toward the impact beam, wherein the impact beam extension and the free end portion are configured to be fitted to each other.

According to the above aspect, the impact beam extension is fitted to the first reinforcement, so that they do not need to be connected. That is, when the impact beam and the impact beam extension receive a load due to a side collision or the like of the vehicle, a stress caused when the impact beam extension is connected to the first reinforcement does not occur. Accordingly, a load transmitted to a connection point between the door inner and the impact beam extension becomes small, thereby restraining a stress concentration.

In the above aspect, when the impact beam moves toward the center of the vehicle in the vehicle width direction upon receipt of a load from outside of the vehicle in the vehicle width direction, the impact beam extension may be fitted to the free end portion.

In the above aspect, before the impact beam receives the load from outside of the vehicle in the vehicle width direction, the impact beam extension may be distanced from the free end portion.

According to the above aspect, in the first reinforcement, the free end portion damns with the support portion serving as a fixed end. When the impact beam and the impact beam extension receive a load due to a side collision or the like of the vehicle and the impact beam extension moves, the impact beam extension is fitted to the first reinforcement. That is, the first reinforcement receives the movement of the impact beam extension. Hereby, the free end portion of the first reinforcement deforms with the support portion serving as the fixed end. Hereby, the received load can be dispersed between the impact beam extension and the first reinforcement, thereby restraining a stress concentration on the connection point between the door inner and the impact beam extension.

In the above aspect, the impact beam extension may include a projection portion projecting toward the center of the vehicle in the vehicle width direction. A tip end of the impact beam may be distanced from the impact beam extension.

In the above aspect, the free end portion may include a receiving portion configured such that the receiving portion receives the projection portion or the projection portion is hooked to the receiving portion.

According to the above aspect, in the first reinforcement, the free end portion can deform with the support portion serving as the fixed end. When the impact beam and the impact beam extension receive a load due to a side collision or the like of the vehicle, a movement of the projection portion of the impact beam extension is received by the receiving portion of the first reinforcement. Hereby, the free end portion of the first reinforcement deforms with the support portion serving as the fixed end. Hereby, the received load can be dispersed between the impact beam extension and the first reinforcement, thereby making it possible to restrain a stress concentration on the connection point between the door inner and the impact beam extension.

In the above aspect, the support portion may be a bending support portion that curves. The free end portion may be a bending free end portion that curves According to the above aspect, the free end portion curves. When the impact beam and the impact beam extension receive a load due to a side collision or the like of the vehicle, it is possible to restrain a stress from being concentrated on one part of the bending free end portion of the first reinforcement. Further, according to the above aspect, similarly to the free end portion, the support portion also curves. Accordingly, when the impact beam and the impact beam extension receive a load due to a side collision or the like of the vehicle, it is possible to restrain a stress from being concentrated on one part of the bending support portion of the first reinforcement.

In the above aspect, the vehicle door structure may further include a second reinforcement including: a first end fixed to the second opposed wall portion together with the door-inner-side end portion; and a second end fixed to the first opposed wall portion together with the support portion of the first reinforcement.

According to the above aspect, a receiving function of the first reinforcement can be reinforced by the second reinforcement. For example, in a case where the above aspect is applied to a front side door, it is possible to restrain the first reinforcement from moving away rearward in the vehicle front-rear direction when the vehicle receives an impact due to a collision from a diagonally front side.

In the above aspect, the first end may be fixed between the second opposed wall portion and the door-inner-side end portion. The second end may be fixed between the first opposed wall portion and the support portion.

In the above aspect, when the impact beam moves toward the center of the vehicle in the vehicle width direction upon receipt of a load from outside in the vehicle width direction, the support portion may deform prior to the free end portion.

According to the above aspect, when the free end portion of the first reinforcement receives a load, the free end portion integrally deforms with the support portion serving as the fixed end, thereby preventing only a tip end of the free end portion from deforming. Accordingly, the projection portion of the impact beam extension can be received by the receiving portion of the first reinforcement.

In the above aspect, a distance from the body wall portion to a fixed portion which is a part between the support portion and the first opposed wall portion may be a predetermined distance or less than the predetermined distance.

In the above aspect, the predetermined distance may be 10 mm.

When a position of the bending support portion of the first reinforcement in the first opposed wall portion is closer to the body wall portion of the door inner, the free end portion easily integrally deforms with the bending support portion serving as the fixed end. According to the above aspect, the distance of the bending support portion from the body wall portion of the door inner is within a buffer distance. Accordingly, by setting the buffer distance to be as short as possible, for example, the bending free end portion easily integrally bends with the bending support portion serving as the fixed end. Accordingly, the projection portion of the impact beam extension can be received by the receiving portion of the first reinforcement.

According to the vehicle door structure configured as above, it is possible to restrain a stress concentration on the connection point between the door inner and the impact beam extension.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a view illustrating a door on a front side and a door on a rear side;

DETAILED DESCRIPTION OF EMBODIMENTS

The following describes an embodiment of this disclosure in detail with reference to the drawings. The following deals with an impact beam of a vehicle door on a left side in a vehicle width direction and on a front side in a vehicle front-rear direction, but this is an exemplification for descriptions. A vehicle door structure of this disclosure is also applicable to impact beams of other vehicle doors. Further, the following deals with an impact beam extension fixed to a front side of the impact beam in the vehicle front-rear direction, but this is an exemplification for descriptions. The vehicle door structure of this disclosure is also applicable to an impact beam extension fixed to a rear side of the impact beam in the vehicle front-rear direction.

A shape, a material, and the like to be described below are exemplifications for descriptions and can be changed appropriately according to a specification and the like of the vehicle door structure. Further, in the following description, similar elements in all drawings have the same reference sign and redundant descriptions thereof are omitted. In each drawing, a vehicle front-rear direction, a vehicle width direction, and a vehicle up-down direction are illustrated appropriately. In terms of the vehicle front-rear direction, a direction indicated by FR is a direction toward a vehicle front side, and its opposite direction is a direction toward a vehicle rear side. In terms of the vehicle width direction, a direction toward a passenger-compartment inner side is indicated by IN, and a direction toward a vehicle outer side is indicated by OUT regardless of a right side and a left side of the vehicle. In terms of the vehicle up-down direction, a direction indicated by UP is a direction toward an upper side relative to a road surface, and its opposite direction is a direction toward a road surface side.

Figure 1:
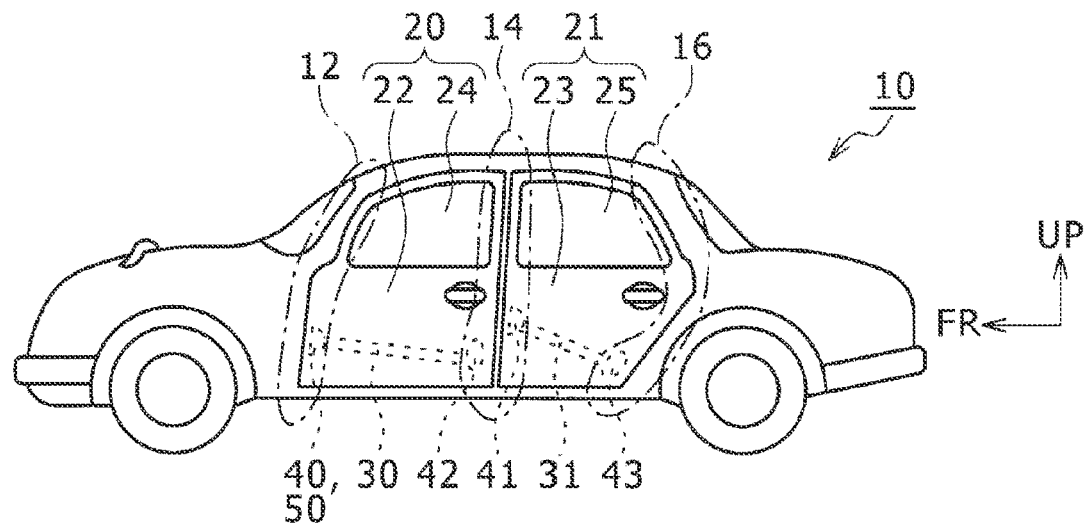
FIG. 1 is a view illustrating a vehicle to which a vehicle door structure of an embodiment is applied.

FIG. 1 is a left side view of a vehicle 10 having a four-door structure. The vehicle 10 includes three pillars 12, 14, 16 provided in a body (not shown). The pillar 12 is a columnar part provided in a standing manner on a front side on a body side surface, and is called an A-pillar or a front pillar. The pillar 14 is a columnar part provided in a standing manner on a central side on the body side surface, and is called a B-pillar or a center pillar. The pillar 16 is a columnar part provided in a standing manner on a rear side on the body side surface, and is called a C-pillar or a rear pillar.

Doors 20, 21 illustrated in FIG. 1 are a vehicle door for opening and closing a door opening though which a driver and a user gets on and off the vehicle. The door 20 on the front side is called a front side door, and the door 21 on the rear side is called a rear side door. The door 20 on the front side is provided between the pillar 12 and the pillar 14, and a front side surface thereof is supported by a door hinge (not shown) rotatably relative to the pillar 12. Further, a rear side surface of the door 20 is released from or abuts with the pillar 14 along with opening/closing of the door 20. The door 21 on the rear side is provided between the pillar 14 and the pillar 16, and a front side surface thereof is supported by a door hinge (not shown) rotatably relative to the pillar 14. Further, a rear side surface of the door 21 is released from or abuts with the pillar 16 along with opening/closing of the door 21.

The door 20 includes a door body portion 22, and a window frame portion 24 attached to an upper part of the door body portion 22. Similarly, the door 21 includes a door body portion 23, and a window frame portion 25 attached to an upper part of the door body portion 23.

Figure 2:
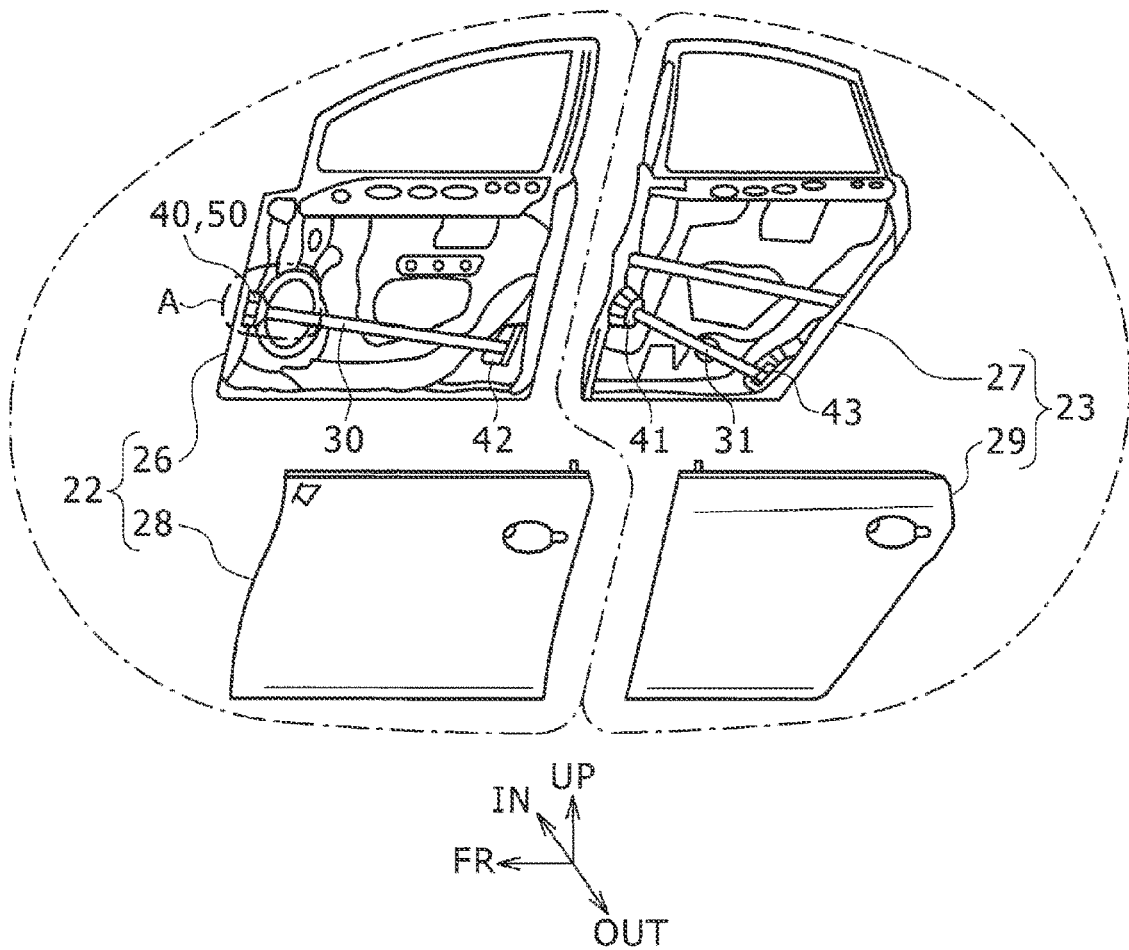
FIG. 2 is a view of the vehicle door structure in FIG. 1, when viewed from an outer side in a vehicle width direction in a state where a door outer panel is removed from a door inner of the door.

FIG. 2 is a view illustrating vehicle door structures of the doors 20, 21. Here, FIG. 2 illustrates a view of the door body portions 22, 23 of the doors 20, 21 in a state where door outer panels 28, 29, which are parts on the vehicle outer side, are removed from door inners 26, 27, which are parts on a passenger compartment side, when viewed from an OUT side of the vehicle 10. FIG. 2 illustrates the vehicle door structure of the door 20 and the vehicle door structure of the door 21. In the doors 20, 21, inner structures of the door inners 26, 27 are observable. The door outer panels 28, 29 have almost the same appearance attached to the vehicle 10.

Impact beams 30, 31 provided inside the doors 20, 21 are rigid members for reinforcing the doors 20, 21. The impact beams 30, 31 specifically receive an impact caused when the vehicle 10 has a side collision, so as to maintain safety of a user in a passenger compartment. The impact beams 30, 31 are made of a cylindrical pipe material, and placed in respective lower parts of the door body portions 22, 23 so as to extend in the vehicle front-rear direction.

Impact beam extensions 40, 42 are connecting members configured to connect the impact beam 30 to the door inner 26 of the door 20. Impact beam extensions 41, 43 are connecting members configured to connect the impact beam 31 to the door inner 27 of the door 21. In the following description, the impact beam extensions 40, 41, 42, 43 are referred to as the extensions 40, 41, 42, 43 unless otherwise specified.

Structures and effects of the impact beam 30 and the extensions 40, 42 in the door 20 are about the same as structures and effects of the impact beam 31 and the extensions 41, 43 in the door 21. The following describes the impact beam 30 and the extensions 40, 42 in the door 20.

In the door 20, the extension 40 connects and fixes a first end (a front end) of the impact beam 30 in a longitudinal direction to a front end side of the door inner 26 in the vehicle front-rear direction. The extension 42 connects and fixes a second end (a rear end) of the impact beam 30 in the longitudinal direction to a rear end side of the door inner 26 in the vehicle front-rear direction. When the vehicle 10 has a side collision, the impact beam 30 receives its load, and along with this, a stress is concentrated on the extensions 40, 41 welded to both ends of the impact beam 30. Generally, mechanical strengths and connection strengths of the impact beam 30 and the extensions 40, 41 are set so as to endure a load determined in advance by collision safety tests and the like. In order to deal with a larger collision load, it is conceivable that the mechanical strengths and the connection strengths of the extensions 40, 41 are increased, for example. However, in a case where the mechanical strengths and the connection strengths of the extensions 40, 41 are increased, the extensions 40, 41 are upsized, so that their masses are increased. That is, a cost increases. The following describes a vehicle door structure that restrains a stress concentration to occur in the extensions 40, 41 at the time of a side collision and deals with a large collision load, within a limited mounting space in the vehicle 10. More specifically, the following describes a connecting method for connecting a front end of the impact beam 30 in the longitudinal direction to a front end of the door inner 26.

As a member configured to restrain a stress concentration that can occur in the extension 40 when the vehicle 10 has a side collision, a first reinforcement 50 is provided on an IN side of the extension 40, as illustrated in FIG. 2. The reason why the wording "first" is assigned to the first reinforcement 50 is because the first reinforcement 50 is distinguished from a second reinforcement 80 (see FIG. 8) to be used in an embodiment in which the first reinforcement 50 is further reinforced. In the following description, the first reinforcement 50 and the second reinforcement 80 are referred to as a first R/F 50 and a second R/F 80 unless otherwise specified.

First described is a structure and an effect of the first R/F 50 with reference to FIGS. 3 to 7, and after that, a case of further using the second R/F 80 will be described with reference to FIGS. 8, 9. Further, a bending manner of the first R/F 50, and the like will be described with reference to FIGS. 10A, 10B, 10C, 10D.

Figure 3:
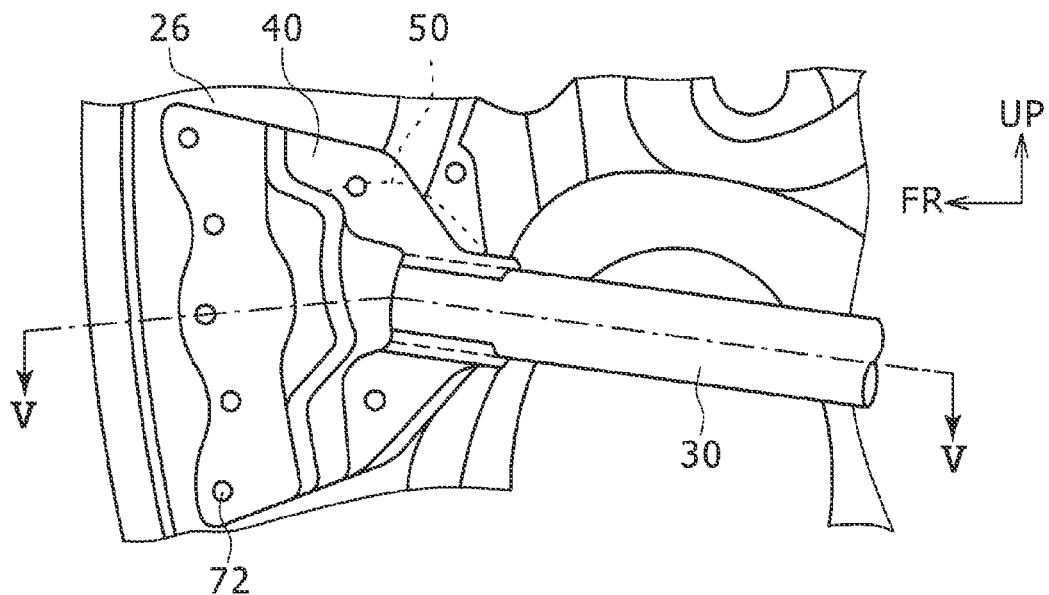
FIG. 3 is a detail drawing of a part A in FIG. 2.
Figure 4:
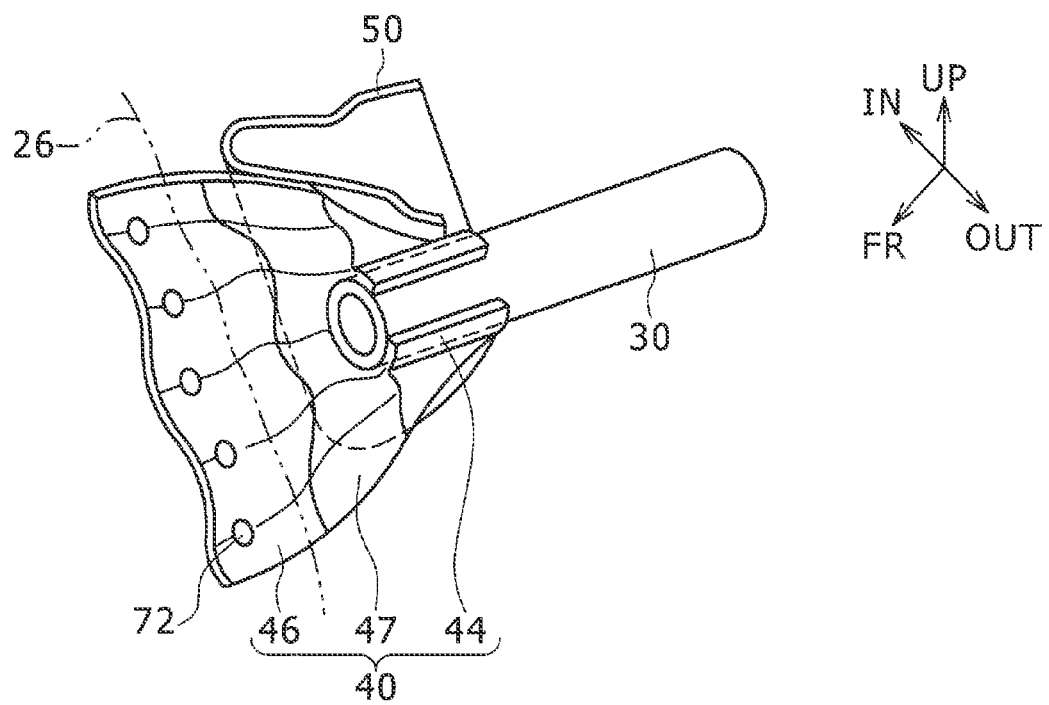
FIG. 4 is a perspective view of a part illustrated in FIG. 3.

FIG. 3 is a detail drawing of a part A in FIG. 2, and is a side view of the door inner 26 viewed from the OUT side. FIG. 4 is a perspective view of a part illustrated in FIG. 3. As illustrated in these figures, the extension 40 is a member obtained such that a plate material is shaped in a predetermined shape. The extension 40 includes a beam-side fixed end portion 44 provided on a cylindrical-impact-beam-30 side, a door-inner-side end portion 46 fixed to the door inner 26, and an inclined portion 47 configured to connect the beam-side fixed end portion 44 to the door-inner-side end portion 46. A most part of the first R/F 50 is covered by the extension 40 so as not to be illustrated in FIG. 3, but in FIG. 4, which is a perspective view, a bending spring shape that receives the extension 40 is partially illustrated.

Figure 5:
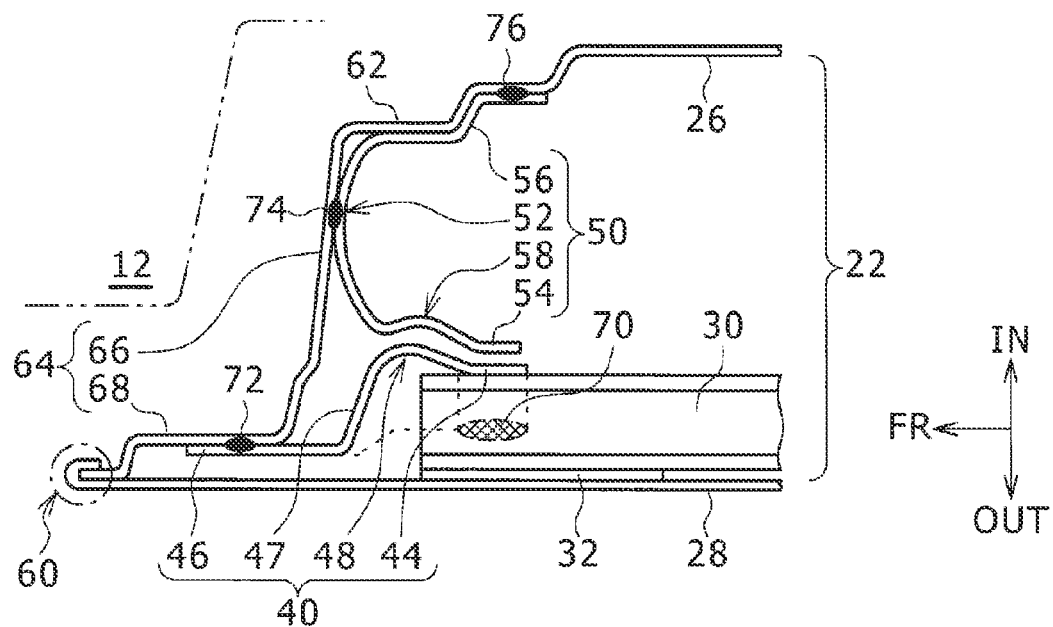
FIG. 5 is a sectional view taken along a line V-V in FIG. 3.

FIG. 5 is a sectional view taken along a line V-V in FIG. 3, in terms of the door body portion 22 when the door 20 is closed in the vehicle 10. The door inner 26 and the door outer panel 28 are placed along the vehicle front-rear direction, and are connected to each other at a peripheral portion 60 except respective upper ends, by use of a hemming process of turning either one of them by an angle of 180 degrees. Hereby, the door body portion 22 with a section having a bag structure is formed. FIG. 5 is a sectional view of the bag structure on an FR side, which is a pillar-12 side, in the door body portion 22.

The door inner 26 includes: a body wall portion 62 projecting toward the IN side in the vehicle width direction so as to extend along the vehicle front-rear direction; and an extending portion 64 extending toward the FR side in the vehicle front-rear direction while bending toward the OUT side in the vehicle width direction from an edge of the body wall portion 62 on the FR side. Note that the body wall portion 62 parallel to the vehicle front-rear direction in FIG. 5 has some steps in practice.

The extending portion 64 of the door inner 26 includes a first opposed wall portion 66, which is a wall surface connected to an edge of the body wall portion 62 on the FR side, bending toward the OUT side in the vehicle width direction, and opposed to the pillar 12 along the vehicle width direction. Further, the extending portion 64 of the door inner 26 includes a second opposed wall portion 68, which is a wall surface connected to an edge of the first opposed wall portion 66 on the OUT side, bending toward the FR side in the vehicle front-rear direction, and opposed to the pillar 12 along the vehicle front-rear direction. An edge of the second opposed wall portion 68 on the FR side is the peripheral portion 60 and is connected to an edge of the door outer panel 28 on the FR side.

The door outer panel 28 extends along the vehicle front-rear direction in the door body portion 22, and constitutes a wall surface on the OUT side. The edge of the door outer panel 28 on the FR side is the peripheral portion 60 subjected to the hemming process. The peripheral portion 60 of the door outer panel 28 surrounds a tip end of the second opposed wall portion 68 of the door inner 26 in a connected manner. An adhesive material 32 is a fixation material placed on a wall surface of the door outer panel 28 on the IN side, so as to fix an outer peripheral surface of the cylindrical shape of the impact beam 30 to the door outer panel 28.

The extension 40 includes: the beam-side fixed end portion 44; an inclined portion 47 extending toward the FR side from the beam-side fixed end portion 44 and bending toward the OUT side; and a door-inner-side end portion 46 further extending from the inclined portion 47 toward the FR side along the vehicle front-rear direction.

The beam-side fixed end portion 44 is a part into which an end of the cylindrical impact beam 30 on the FR side is inserted, and is a semi-cylindrical portion making contact with a generally semi-circumferential part on the IN side of an outer peripheral surface of the impact beam 30. In a state where the impact beam 30 is inserted into the semi-cylindrical portion, a contact end of the beam-side fixed end portion 44 along the vehicle front-rear direction is connected, as a welding part 70, to the impact beam 30 by spot welding.

The inclined portion 47 connects the beam-side fixed end portion 44 to the door-inner-side end portion 46 on the OUT side relative to the fixed end portion 44. A projection portion 48 included in the inclined portion 47 is a part further projecting toward the IN side from the impact beam 30 in a part where the inclined portion 47 is connected to an FR-side end of the welding part 70 of the beam-side fixed end portion 44. The projection portion 48 curves such that a central part of the projection portion 48 approaches the door inner 26. The projection portion 48 is provided by curving a part of the inclined portion. The projection portion 48 is a contact-prevention swelling portion configured to prevent the extension 40 from making contact with a corner part of an FR end of the impact beam 30 in the longitudinal direction. In the condition that the fixed end portion 44 and the impact beam 30 is fixed, the FR end of the impact beam 30 and the extension 40 is recessed. The projection portion 48 suppresses such a situation that, when the vehicle 10 has a side collision and the impact beam 30 moves toward the IN side due to its impact, the corner part of the FR end of the impact beam 30 in the longitudinal direction hits the extension 40 to cause a stress concentration and the like in the extension 40.

The door-inner-side end portion 46 is superimposed on the second opposed wall portion 68 of the door inner 26 in a part extending in the vehicle front-rear direction from the FR-side end of the inclined portion 47, and connected to the door inner 26 by spot welding in welding parts 72. The welding parts 72 are provided at several places along a width direction of a fan-shaped part of the door-inner-side end portion 46 (see FIGS. 3, 4).

The first R/F 50 is a member having a bending spring shape that receives the extension 40 as described in terms of FIG. 4. The first R/F 50 is a bending plate member extending along the body wall portion 62 and the first opposed wall portion 66 of the door inner 26 and further extends toward the impact beam 30, so as to form a generally C-shape. The first R/F 50 is fixed to the first opposed wall portion 66 at a position corresponding to a generally C-shaped swelling portion as a welding part 74. This fixed position serves as a bending support portion 52, and a part extending from the bending support portion 52 toward the impact beam 30 is a bending free end portion 54 that does not have a fixed portion. The bending free end portion 54 can bend with the bending support portion 52 as a fixed end, and this part has a function as a bending spring. A part extending from the bending support portion 52 along the first opposed wall portion 66 and the body wall portion 62 is an attachment portion 56, and is fixed to be attached to the body wall portion 62 of the door inner 26 at a welding part 76. The welding parts 74, 76 are parts where connection by spot welding is performed, similarly to the welding parts 70, 72.

A receiving portion 58 provided in the bending free end portion 54 is a recessed portion opposed to the extension 40 and provided at a position where the projection portion 48 is received. The recessed portion as the receiving portion 58 is a part projecting toward the OUT side and recessed toward the IN side, in the first R/F 50. The receiving portion 58 may not be a recessed portion, but may have a shape that receives the projection portion 48 or to which the projection portion 48 is hooked. For example, the receiving portion 58 may be a hole corresponding to the projection portion 48. FIG. 5 is a view illustrating a normal state where the door body portion 22 does not receive a load in the vehicle width direction. In FIG. 5, the bending free end portion 54 is in a natural state, includes the receiving portion 58, and is placed in a separated manner from the extension 40 so as not to make contact therewith.

The receiving portion 58 first receives the projection portion 48 projecting most toward the IN side in the extension 40 in a state where the extension 40 is to move toward the IN side. Effects of the impact beam 30, the extension 40, the first R/F 50, and the like at the time when the vehicle 10 has a side collision will be described with reference to FIGS. 6 and 7.

Figure 6:
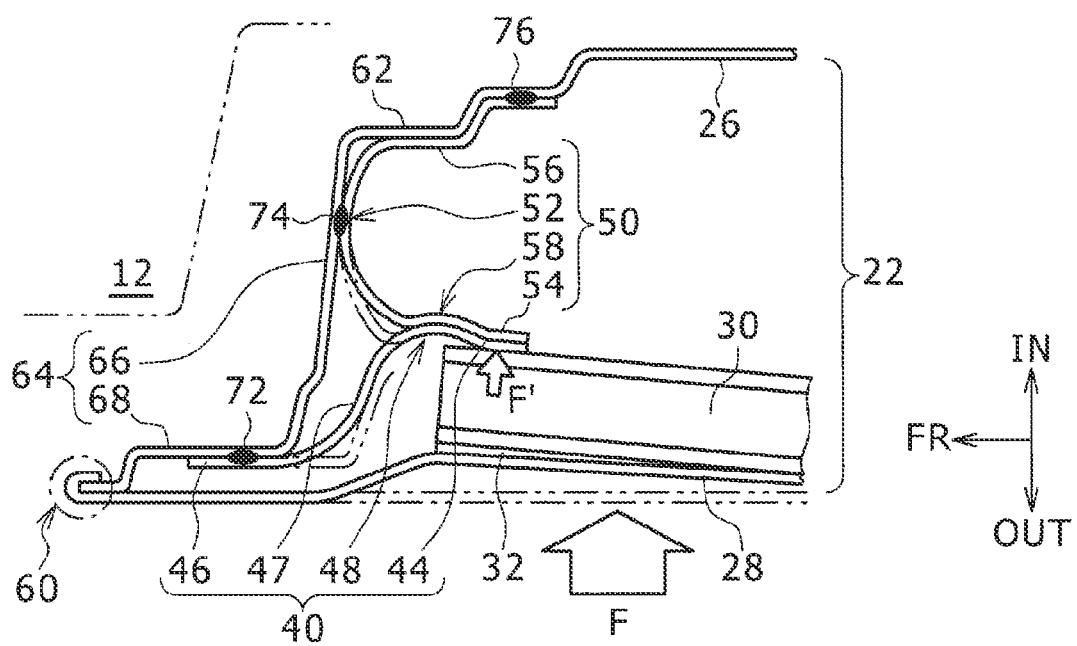
FIG. 6 is a view illustrating operations of an impact beam, an impact beam extension, and a first reinforcement at the time of receiving an impact due to a collision from a side surface of the vehicle.
Figure 7:
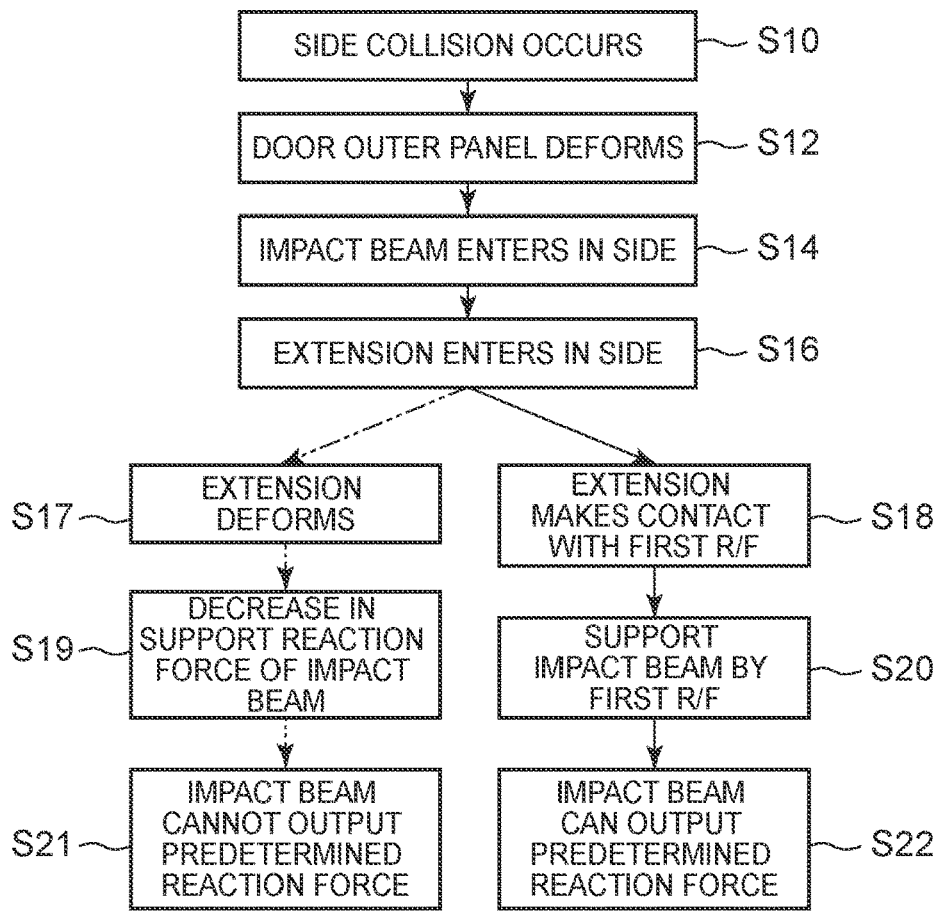
FIG. 7 is a flow chart in which an effect of a configuration of FIG. 5 is compared with a related art.

When the vehicle 10 has a side collision, the doors 20, 21 receive its impact. In terms of the door 20, the impact beam 30 outputs a reaction force with respect to the impact of the side collision while curving so as to project toward the IN side, thereby restraining deformation of the door 20 and protecting a user and the like in the passenger compartment. This series of actions occurs in an extremely short time and finishes. FIG. 6 is a view corresponding to FIG. 5 and illustrates a state of the end of the series of actions caused upon receipt of the impact of the side collision. FIG. 7 is a flowchart sequentially illustrating the series of actions in an extremely short time.

In FIG. 7, when the vehicle 10 has a side collision (S10), a load F indicated by a white arrow in FIG. 6 is applied to a vehicle side surface in FIG. 6, so that the door outer panel 28, which is an element placed on the most OUT side of the door 20, deforms (S12). In FIG. 6, a state of FIG. 5, which is before the load F is applied, is indicated by an alternate long and two short dashes line. When the load F is received, the door outer panel 28 deforms toward the IN side from the state indicated by the alternate long and two short dashes line. Then, the impact beam 30 fixed to the inner wall surface of the door outer panel 28 with the adhesive material 32 deforms toward the IN side while curving to project toward the IN side while the extensions 40, 42 connected to both ends in the longitudinal direction are taken as fulcrums (S14). In the example of FIG. 6, a position where the load F due to the side collision is received is an FR-end side of the impact beam 30, but this is an exemplification. The load F directed toward the vehicle width direction may be received at a position except the above along the vehicle front-rear direction. As illustrated in FIG. 6, a movement of the FR-side end of the impact beam 30 to enter the IN side provides a load F' indicated by a white arrow to the beam-side fixed end portion 44 of the extension 40. Due to the load F' applied to the beam-side fixed end portion 44, the extension 40 enters the IN side (S16).

The action up to this point is the same as a case where the first R/F 50 is not provided. In comparison with the effect of the door structure in FIG. 5, FIG. 7 illustrates a progress after S16 in the case where the first R/F 50 is not provided, by an alternate long and two short dashes line. In the case where the first R/F is not provided, when the load F' indicated by the white arrow is applied to the beam-side fixed end portion 44 of the extension 40, a stress is concentrated on the welding part 72 where the extension 40 is connected to the second opposed wall portion 68 of the door inner 26, so that the extension 40 deforms (S17). In other words, when the load F' exceeds a mechanical strength of the extension 40, the entry of the impact beam 30 cannot be supported by the extension 40, so that a support reaction force of the impact beam 30 decreases (S19). The support reaction force of the impact beam 30 is a reaction force that supports the load F by a mechanical strength of the impact beam 30 itself at the time when the extension 40 supports the load F. As such, in the case where the first R/F is not provided, if the load F to be received due to a side collision is larger than expected, the extension 40 cannot support the load F', so that the impact beam 30 cannot output a predetermined reaction force (S21).

A progress after S16 in the door structure of FIG. 5 is illustrated as a flow indicated by a continuous line in FIG. 7. Since the first R/F 50 is provided in the door structure of FIG. 5, when the extension 40 enters the IN side in S16, the extension 40 makes contact with the first R/F 50 (S18). FIG. 6 illustrates a state where the extension 40 makes contact with the first R/F 50 so that the receiving portion 58 of the first R/F 50 receives the projection portion 48 of the extension 40. Accordingly, the load F to be applied from the FR-side end of the impact beam 30 is dispersed into two, i.e., the extension 40 and the first R/F 50. Accordingly, a load to be applied to the extension 40 becomes smaller than F', and in terms of a load corresponding a reduced amount, the first R/F 50 supports the impact beam 30 (S20). More specifically, the bending free end portion 54 bends toward the IN side with the bending support portion 52 serving as the fixed end, so that the first R/F 50 supports a load from the FR-side end of the impact beam 30 by a recoil strength of the bending spring. That is, the load F is supported by the extension 40 and the first R/F 50 in a dispersed manner, so that the impact beam can output a predetermined reaction force up to a large load F' as compared to the case where the first R/F is not provided (S22). Accordingly, in the configuration of FIG. 5, it is possible to restrain the stress concentration on the welding part 72 where the extension 40 is connected to the second opposed wall portion 68 of the door inner 26.

FIG. 6 illustrates the case where the vehicle 10 has a side collision. When the vehicle 10 has a collision from a diagonally front side, the beam-side fixed end portion 44 of the extension 40 receives a load, and in addition, the welding part 74 that connects the first R/F 50 to the first opposed wall portion 66 receives the load from the diagonally front side. If this causes the first R/F 50 to move away rearward in the vehicle front-rear direction, a dispersedly receiving function of the first R/F 50 to dispersedly receive the load might not work sufficiently. FIGS. 8, 9 are views illustrating a door structure and its effect, the door structure being able to secure the dispersedly receiving function of the first R/F 50 to dispersedly receive a load even in a case where the vehicle 10 has a collision from the diagonally front side.

Figure 8:
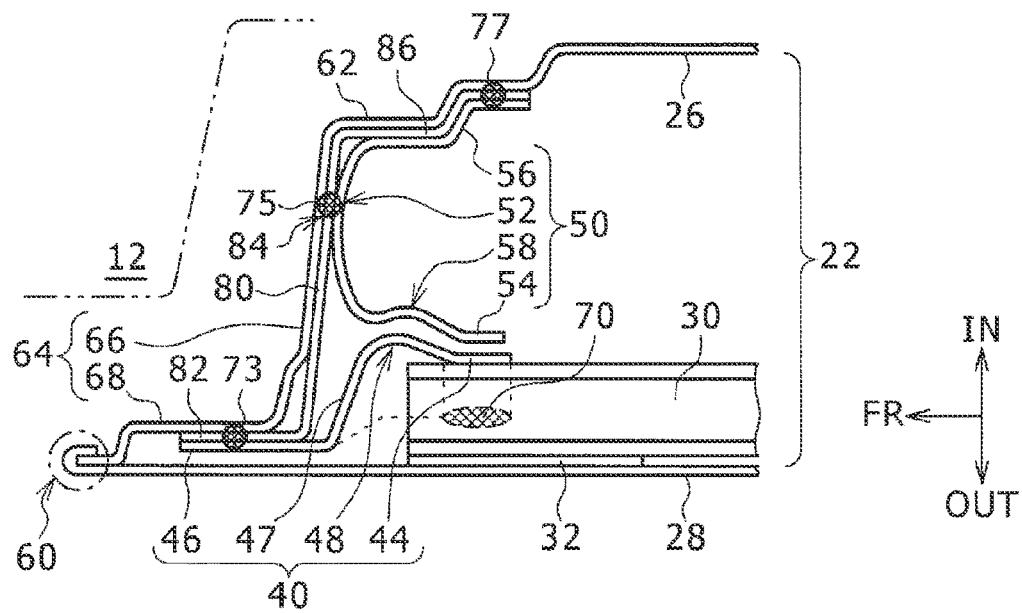
FIG. 8 is a sectional view corresponding to FIG. 5 in terms of an embodiment using a second reinforcement.

FIG. 8 is a view corresponding to FIG. 5, and is a view illustrating a structure of the door body portion 22 provided with the second R/F 80 for reinforcing the dispersedly receiving function of the first R/F 50. The second R/F 80 includes: a first end 82 fixed to the second opposed wall portion 68 of the door inner 26 together with the door-inner-side end portion 46 of the extension 40; and a second end 84 fixed to the first opposed wall portion 66 of the door inner 26 together with the bending support portion 52 of the first R/F 50. A part extending from the second end 84 along the first opposed wall portion 66 and the body wall portion 62 is an attachment portion 86 via which the second R/F 80 is attached to the body wall portion 62 of the door inner 26.

A welding part 73 corresponds to the welding part 72 in FIG. 5, but here, the welding part 73 is a three-layer welding point where the second opposed wall portion 68 of the door inner 26, a first end 82 of the second R/F 80, and the door-inner-side end portion 46 of the extension 40 are laminated in this order. Similarly, a welding part 75 corresponds to the welding part 74 in FIG. 2, but the welding part 75 is a three-layer welding point where the first opposed wall portion 66 of the door inner 26, the second end 84 of the second R/F 80, and the bending support portion 52 of the first R/F 50 are laminated in this order. Further, a welding part 77 corresponds to the welding part 76 in FIG. 2, but the welding part 77 is a three-layer welding point where the body wall portion 62 of the door inner 26, the attachment portion 86 of the second R/F 80, and the attachment portion 56 of the first R/F 50 are laminated in this order.

Figure 9:
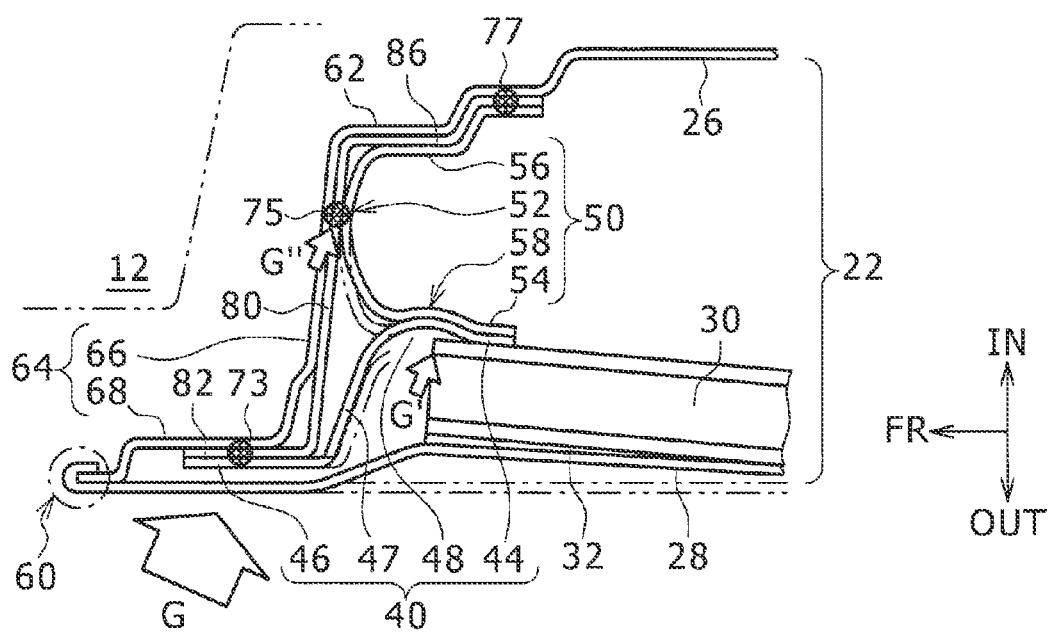
FIG. 9 is an operation diagram of each element corresponding to FIG. 6, in terms of FIG. 8.

FIG. 9 is a view corresponding to FIG. 6 and illustrates a state of the end of a series of actions caused when the vehicle 10 receives an impact due to a collision from the diagonally front side. A load G received by the door body portion 22 when the vehicle 10 receives an impact due to the collision from the diagonally front side is indicated by a white arrow. Due to the load G, a load G' indicated by a white arrow is applied to the beam-side fixed end portion 44 of the extension 40, and a load G' indicated by a white arrow is applied to the welding part 75. When the load G' indicated by the white arrow is applied to the welding part 75, the bending support portion 52 of the first R/F 50 might move away rearward in the vehicle front-rear direction along a direction of the white arrow.

In FIG. 9, the second R/F 80, the first end 82 of which is connected at the welding part 73, is provided so as to extend along the inner wall surface of the door inner 26, and the first opposed wall portion 66 of the door inner 26 and the bending support portion 52 of the first R/F 50 are connected to the second R/F 80 at the welding part 75. A connection strength of the three-layer welding at the welding part 75 is stronger than a connection strength of two-layer welding at the welding part 74 in FIG. 5. Accordingly, even if the load G' is applied in a direction of the white arrow, the bending support portion 52 of the first R/F 50 can be held firmly. Accordingly, even when the vehicle 10 receives an impact due to a collision from the diagonally front side, the first R/F 50 does not move away rearward in the vehicle front-rear direction along the direction of the white arrow, so that the dispersedly receiving function of the first R/F 50 works sufficiently.

As described above, the first R/F 50 is a bending cantilever attached to the door inner 26 at the attachment portion 56 and configured such that the bending support portion 52 serves as a fulcrum and the bending free end portion 54 serves as a free end. The bending cantilever has a high ability to absorb a load applied to a tip end of a free end as compared to a cantilever extending linearly. Further, since the receiving portion 58 is provided, a load can be received not only by a tip end of the bending free end portion 54, but also by a large area around the receiving portion 58. In order that the first R/F 50 receives a load effectively, a bending manner of the bending free end portion 54, which is a free end of the bending cantilever, is important.

FIGS. 10A to 10D is views illustrating the bending manner of the first R/F 50. In FIGS. 10A to 10D, a wall surface to which the first R/F 50 is fixed is indicated by oblique lines. In a case of FIGS. 5, 6, the wall surface to which the first R/F 50 is fixed is a wall surface of the door inner 26, and in a case of FIGS. 8, 9, the wall surface to which the first R/F 50 is fixed is the wall surfaces of the door inner 26 and the second R/F 80. Further, in FIGS. 10A to 10D, a load to be applied to the bending free end portion 54 of the first R/F 50 is indicated by a white arrow. The load to be applied to the bending free end portion 54 of the first R/F 50 is F' in the case of FIGS. 5, 6, and the load to be applied to the bending free end portion 54 of the first R/F 50 is G' in the case of FIGS. 8, 9. Further, a displacement direction of the bending free end portion 54 is indicated by an arrow.

Figure 10A:
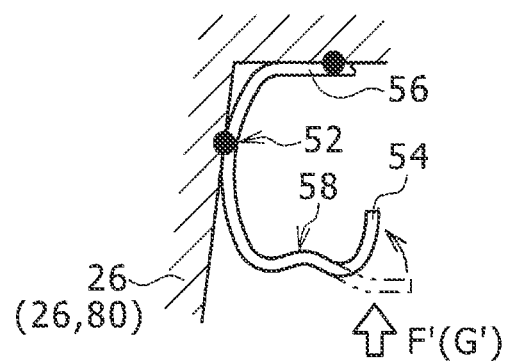
FIG. 10A is a view illustrating an example of a bending manner of a free end portion in which a tip end easily bends.

FIG. 10A is a view illustrating an example of a bending manner in which only the tip end of the bending free end portion 54 easily bends. In this example, when the tip end receives a load F' (G'), the bending free end portion 54 does not bend with the bending support portion 52 as the fulcrum, but a very tip end of the bending free end portion 54 bends. This bending manner occurs, for example, in a case where a bending rigidity of the tip end of the bending free end portion 54 is small as compared with a bending rigidity of a root portion near the bending support portion 52. The bending manner of FIG. 10A cannot make use of a characteristic of the bending cantilever, so the load F' (G') cannot be dispersed between the bending free end portion 54 and the extension 40, and the load F' (G') is mostly applied to the extension 40. In the bending manner of FIG. 10A, when a load F (G) received by the door body portion 22 is excessive, the impact beam 30 might slip through the bending free end portion 54 toward the IN side.

Figure 10B:
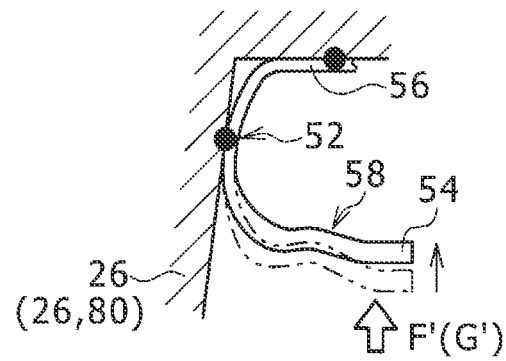
FIG. 10B is a view illustrating an improved manner of FIG. 10A and is a view illustrating an example in which a bending rigidity of the tip end is increased.
Figure 10C:
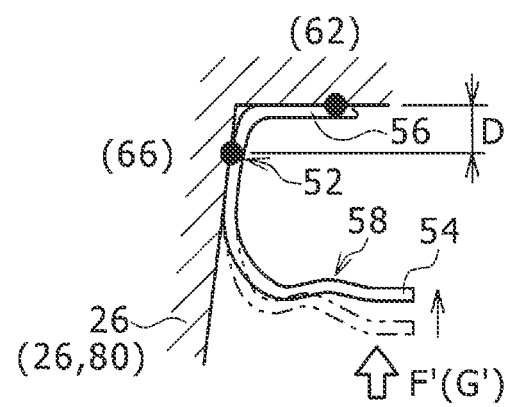
FIG. 10C is a view illustrating an improved manner of FIG. 10A and is a view illustrating an example in which a fixed position of a first reinforcement is placed closer to a body wall portion of the door inner.
Figure 10D:
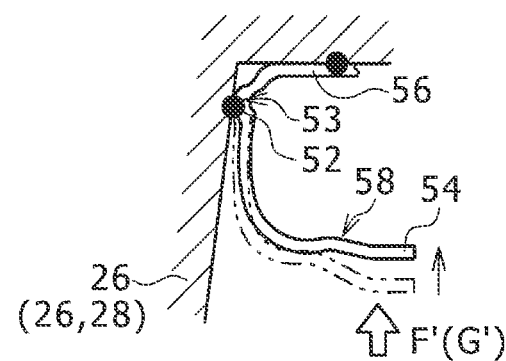
FIG. 10D is a view illustrating an improved manner of FIG. 10A and is a view illustrating an example in which a range of a fixed position of a bending support portion is narrowed.

FIGS. 10B to 10D are examples of a structure of the first R/F 50 that bends so as to make use of the characteristic of the bending cantilever. These are examples of a structure in which the root portion of the bending free end portion 54 on a side closer to the bending support portion 52 bends more easily than the tip end of the bending free end portion 54.

FIG. 10B is an example in which a plate thickness of the tip end of the bending free end portion 54 is thicker than a plate thickness of the root portion. Since the bending rigidity of the tip end becomes large in comparison with the bending rigidity of the root portion, it is possible to prevent only a very tip end of the bending free end portion 54 from bending. That is, the whole bending free end portion 54 easily integrally bends with the bending support portion 52 serving as the fulcrum. Since the whole bending free end portion 54 integrally bends with the bending support portion 52 serving as the fulcrum, the load F' (G') can be dispersed between the extension 40 and the first R/F 50.

FIG. 10C is a view illustrating an example in which the bending support portion 52, which is a bending fixed position of the first R/F 50, is placed as closest to the body wall portion 62 of the door inner 26 as possible. A distance D from the body wall portion 62 of the door inner 26 to the bending support portion 52 is illustrated in FIG. 10C. To be "placed as closed to the body wall portion 62 of the door inner 26 as possible" is that the bending support portion 52 is fixed to the first opposed wall portion 66 by setting the distance D within a buffer distance $D_0$ determined in advance. The buffer distance $D_0$ can be determined within an allowable range or the like in which a welding operation is performable. For example, in the case of FIGS. 5, 6, if the buffer distance $D_0$ determined by a specification of a welding device is 10 mm, a position on the first opposed wall portion 66, which is 10 mm or less measured from an inner wall surface of the body wall portion 62 toward the OUT side, is set as the welding part 74. In the case of FIGS. 8, 9, a position on the first opposed wall portion 66, which is 10 mm or less measured from an inner wall surface of the second R/F 80 put on the body wall portion 62 toward the OUT side, is set as the welding part 75. A value of the buffer distance $D_0$ is an example for descriptions, and is changed appropriately depending on a shape of the door body portion 22, the specification of the welding device, and the like.

When the bending support portion 52 of the first R/F 50 is fixed to the first opposed wall portion 66 by setting the distance D from the body wall portion 62 of the door inner 26 within the buffer distance $D_0$ determined in advance, a large bending swing amount of the bending free end portion 54 with the bending support portion 52 serving as the fulcrum can be achieved. Accordingly, the whole bending free end portion 54 easily integrally bends with the bending support portion 52 serving as the fulcrum, thereby making it possible to disperse the load F' (G') between the bending free end portion 54 and the extension 40.

FIG. 10D is a view illustrating an example in which a range of the fixed position of the bending support portion 52 of the first R/F 50 is narrowed. Herein, a local overhanging portion 53 is provided in a part corresponding to the bending support portion 52. The welding part 74 (75) is assumed the overhanging portion 53. Hereby, the whole bending free end portion 54 integrally bends with a narrow range limited by the overhanging portion 53 being taken as a fulcrum, thereby making it possible to disperse the load F (G') between the bending free end portion 54 and the extension 40. Instead of providing the overhanging portion 53 in the bending support portion 52, the overhanging portion 53 may be provided in the door inner 26 or the second R/F 80.

The vehicle door structure of the present embodiment includes the door inner 26 and the door outer panel 28. The door inner 26 includes the body wall portion 62 placed along the vehicle front-rear direction. Further, the door inner 26 includes: the first opposed wall portion 66 extending outward in the vehicle width direction from the body wall portion 62 and placed opposed to the pillar 12 along the vehicle width direction; and the second opposed wall portion 68 extending from the first opposed wall portion 66 and placed opposed to the pillar 12 along the vehicle front-rear direction. The door outer panel 28 is placed outside the door inner in the vehicle width direction, so as to be opposed to the door inner along the vehicle front-rear direction, and the door outer panel 28 and the door inner are connected to each other at the peripheral portion 60. The vehicle door structure includes the impact beam 30 placed between the door inner 26 and the door outer panel 28 with its longitudinal direction being along the vehicle front-rear direction. Further, the vehicle door structure includes: the door-inner-side end portion 46 fixed to the second opposed wall portion 68 of the door inner 26; and the impact beam extension 40 including the beam-side fixed end portion 44. Here, in order to avoid a contact with the corner part of the end of the impact beam 30 in the longitudinal direction, the door-inner-side end portion 46 includes the projection portion 48 projecting inwardly in the vehicle width direction. Further, the vehicle door structure further includes the first reinforcement 50. The first reinforcement 50 includes the bending support portion 52 fixed to the first opposed wall portion 66 of the door inner 26, and the bending free end portion 54 placed so as to be distanced from the impact beam extension 40 in a natural state. The bending free end portion 54 extends from the bending support portion 52 toward the impact beam 30, and includes the receiving portion 58 corresponding to the projection portion 48 of the impact beam extension 40.

With the above configuration, in the first R/F 50, the bending free end portion 54 can bend with the bending support portion 52 serving as the fixed end. When the impact beam 30 and the extension 40 receive a load F' due to a side collision or the like of the vehicle, the receiving portion 58 of the first R/F 50 receives a movement of the projection portion 48 of the extension 40. Hereby, the bending free end portion 54 of the first R/F 50 bends with the bending support portion 52 serving as the fixed end. As such, the load F' thus received can be dispersed between the extension 40 and the first R/F 50, and a stress concentration on the welding part 72 where the extension 40 is connected to the second opposed wall portion 68 of the door inner 26 can be restrained.

What is claimed is:

1. A vehicle door structure comprising:
    a door inner including
        a body wall portion placed along a vehicle front-rear direction,
        a first opposed wall portion extending toward outside of a vehicle in a vehicle width direction from an edge of the body wall portion in the vehicle front-rear direction, and
        a second opposed wall portion extending from an outer edge of the first opposed wall portion in the vehicle width direction so as to be away from a center of the body wall portion in the vehicle front-rear direction;
    a door outer panel placed further from a center of the vehicle than the door inner is in the vehicle width direction so as to be opposed to the door inner, an peripheral edge of the door outer panel being connected to the second opposed wall portion;
    an impact beam extending in the vehicle front-rear direction between the door inner and the door outer panel;
    an impact beam extension including a door-inner-side end portion fixed to the first opposed wall portion or the second opposed wall portion, and a fixed end, the impact beam being fixed on an outer surface of the fixed end in the vehicle width direction, the impact beam extension includes a projection portion projecting toward the center of the vehicle in the vehicle width direction; and
    a first reinforcement including a support portion fixed to the first opposed wall portion, and a free end portion extending from the support portion toward the impact beam, wherein
    the impact beam extension and the free end portion are configured to be fitted to each other, and
    a tip end of the impact beam is distanced from the impact beam extension.

2. The vehicle door structure according to claim 1, wherein
    when the impact beam moves toward the center of the vehicle in the vehicle width direction upon receipt of a load from outside of the vehicle in the vehicle width direction, the impact beam extension is fitted to the free end portion.

3. The vehicle door structure according to claim 2, wherein,
    before the impact beam receives the load from outside of the vehicle in the vehicle width direction, the impact beam extension is distanced from the free end portion.

4. The vehicle door structure according to claim 1, wherein
    the free end portion includes a receiving portion configured such that the receiving portion receives the projection portion or the projection portion is hooked to the receiving portion.

5. The vehicle door structure according to claim 1, wherein
    the support portion is a bending support portion that curves, and
    the free end portion is a bending free end portion that curves.

6. The vehicle door structure according to claim 1, further comprising
    a second reinforcement including
        a first end fixed to the second opposed wall portion together with the door-inner-side end portion, and
        a second end fixed to the first opposed wall portion together with the support portion of the first reinforcement.

7. The vehicle door structure according to claim 6, wherein
    the first end is fixed between the second opposed wall portion and the door-inner-side end portion, and
    the second end is fixed between the first opposed wall portion and the support portion.

8. The vehicle door structure according to claim 1, wherein,
    when the impact beam moves toward the center of the vehicle in the vehicle width direction upon receipt of a load from outside in the vehicle width direction, the support portion deforms prior to the free end portion.

9. The vehicle door structure according to claim 1, wherein a distance from the body wall portion to a fixed portion which is a part between the support portion and the first opposed wall portion is a predetermined distance or less than the predetermined distance.

10. The vehicle door structure according to claim 9, wherein
the predetermined distance is 10 mm.

11. A vehicle door structure comprising:
a door inner including
a body wall portion placed along a vehicle front-rear direction,
a first opposed wall portion extending toward outside of a vehicle in a vehicle width direction from an edge of the body wall portion in the vehicle front-rear direction, and
a second opposed wall portion extending from an outer edge of the first opposed wall portion in the vehicle width direction so as to be away from a center of the body wall portion in the vehicle front-rear direction;
a door outer panel placed further from a center of the vehicle than the door inner is in the vehicle width direction so as to be opposed to the door inner, an peripheral edge of the door outer panel being connected to the second opposed wall portion;
an impact beam extending in the vehicle front-rear direction between the door inner and the door outer panel;
an impact beam extension including a door-inner-side end portion fixed to the first opposed wall portion or the second opposed wall portion, and a fixed end, the impact beam being fixed on an outer surface of the fixed end in the vehicle width direction;
a first reinforcement including a support portion fixed to the first opposed wall portion, and a free end portion extending from the support portion toward the impact beam; and
a second reinforcement including:
a first end fixed to the second opposed wall portion together with the door-inner-side end portion, and
a second end fixed to the first opposed wall portion together with the support portion of the first reinforcement, wherein
the impact beam extension and the free end portion are configured to be fitted to each other.

12. The vehicle door structure according to claim 11, wherein
the first end is fixed between the second opposed wall portion and the door-inner-side end portion, and
the second end is fixed between the first opposed wall portion and the support portion.

13. The vehicle door structure according to claim 11, wherein,
when the impact beam moves toward the center of the vehicle in the vehicle width direction upon receipt of a load from outside in the vehicle width direction, the support portion deforms prior to the free end portion.

14. The vehicle door structure according to claim 11, wherein
a distance from the body wall portion to a fixed portion which is a part between the support portion and the first opposed wall portion is a predetermined distance or less than the predetermined distance.

15. The vehicle door structure according to claim 14, wherein
the predetermined distance is 10 mm.

16. A vehicle door structure comprising:
a door inner including
a body wall portion placed along a vehicle front-rear direction,
a first opposed wall portion extending toward outside of a vehicle in a vehicle width direction from an edge of the body wall portion in the vehicle front-rear direction, and
a second opposed wall portion extending from an outer edge of the first opposed wall portion in the vehicle width direction so as to be away from a center of the body wall portion in the vehicle front-rear direction;
a door outer panel placed further from a center of the vehicle than the door inner is in the vehicle width direction so as to be opposed to the door inner, an peripheral edge of the door outer panel being connected to the second opposed wall portion;
an impact beam extending in the vehicle front-rear direction between the door inner and the door outer panel;
an impact beam extension including a door-inner-side end portion fixed to the first opposed wall portion or the second opposed wall portion, and a fixed end, the impact beam being fixed on an outer surface of the fixed end in the vehicle width direction; and
a first reinforcement including a support portion fixed to the first opposed wall portion, and a free end portion extending from the support portion toward the impact beam, wherein
the impact beam extension and the free end portion are configured to be fitted to each other, and
when the impact beam moves toward the center of the vehicle in the vehicle width direction upon receipt of a load from outside in the vehicle width direction, the support portion deforms prior to the free end portion.

17. The vehicle door structure according to claim 16, wherein
a distance from the body wall portion to a fixed portion which is a part between the support portion and the first opposed wall portion is a predetermined distance or less than the predetermined distance.

18. The vehicle door structure according to claim 17, wherein
the predetermined distance is 10 mm.

19. A vehicle door structure comprising:
a door inner including
a body wall portion placed along a vehicle front-rear direction,
a first opposed wall portion extending toward outside of a vehicle in a vehicle width direction from an edge of the body wall portion in the vehicle front-rear direction, and
a second opposed wall portion extending from an outer edge of the first opposed wall portion in the vehicle width direction so as to be away from a center of the body wall portion in the vehicle front-rear direction;
a door outer panel placed further from a center of the vehicle than the door inner is in the vehicle width direction so as to be opposed to the door inner, an peripheral edge of the door outer panel being connected to the second opposed wall portion;
an impact beam extending in the vehicle front-rear direction between the door inner and the door outer panel;
an impact beam extension including a door-inner-side end portion fixed to the first opposed wall portion or the second opposed wall portion, and a fixed end, the impact beam being fixed on an outer surface of the fixed end in the vehicle width direction; and a first reinforcement including a support portion fixed to the first opposed wall portion, and a free end portion extending from the support portion toward the impact beam, wherein the impact beam extension and the free end portion are configured to be fitted to each other, and a distance from the body wall portion to a fixed portion which is a part between the support portion and the first opposed wall portion is a predetermined distance or less than the predetermined distance.

20. The vehicle door structure according to claim 19, wherein the predetermined distance is 10 mm.

* * * * *